United States Patent
Hu et al.

(10) Patent No.: US 12,103,237 B2
(45) Date of Patent: Oct. 1, 2024

(54) PARTICLES COMPRISING MARKING ADDITIVES FOR SELECTIVE LASER SINTERING-BASED ADDITIVE MANUFACTURING SYSTEMS

(71) Applicant: XEROX CORPORATION, Norwalk, CT (US)

(72) Inventors: Nan Xing Hu, Oakville (CA); Yulin Wang, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 18/155,833

(22) Filed: Jan. 18, 2023

(65) Prior Publication Data
US 2023/0150207 A1     May 18, 2023

Related U.S. Application Data

(62) Division of application No. 16/722,255, filed on Dec. 20, 2019, now Pat. No. 11,584,086.

(51) Int. Cl.
| | |
|---|---|
| *B29C 64/393* | (2017.01) |
| *B22F 10/00* | (2021.01) |
| *B29C 64/118* | (2017.01) |
| *B33Y 50/02* | (2015.01) |
| *B33Y 70/00* | (2020.01) |

(52) U.S. Cl.
CPC ............ *B29C 64/393* (2017.08); *B22F 10/00* (2021.01); *B29C 64/118* (2017.08); *B33Y 50/02* (2014.12); *B33Y 70/00* (2014.12); *C08K 2201/013* (2013.01); *C08L 2205/00* (2013.01)

(58) Field of Classification Search
CPC .... B33Y 70/00; C08K 2201/013; C08K 3/22; C08K 3/36; C08K 3/32; C08L 2205/00; C08L 83/04; C08L 77/02; C08L 75/04
See application file for complete search history.

(56) References Cited

U.S. PATENT DOCUMENTS

| | | | | |
|---|---|---|---|---|
| 2011/0229545 | A1* | 9/2011 | Shum | B01F 23/41 977/773 |
| 2013/0188003 | A1* | 7/2013 | Thaker | C08J 3/226 524/413 |
| 2018/0244862 | A1* | 8/2018 | Price | B33Y 70/10 |

FOREIGN PATENT DOCUMENTS

WO    WO 97/45476    * 12/1997

* cited by examiner

*Primary Examiner* — Doris L Lee
(74) *Attorney, Agent, or Firm* — Vorys, Sater, Seymour and Pease LLP

(57) ABSTRACT

A particle and a method for producing the same is disclosed. For example, the particle includes a polymer resin that is compatible with a three-dimensional (3D) printing process to print a three-dimensional (3D) object and a marking additive that allows selective portions of the 3D object to change color when exposed to a light, wherein the marking additive is added to approximately 0.01 to 25.00 weight percent (wt %).

8 Claims, 4 Drawing Sheets

PARTICLES COMPRISING MARKING ADDITIVES FOR SELECTIVE LASER SINTERING-BASED ADDITIVE MANUFACTURING SYSTEMS

The present disclosure relates generally to particles for selective laser sintering (SLS)-based additive manufacturing systems and, more particularly, to particles that include marking additives for SLS-based additive manufacturing systems.

BACKGROUND

Three-dimensional (3D) printing is a technology that allows 3D objects to be printed with controlled internal and external geometry layer-by-layer using a computer-aided design (CAD) file. For example, a starting material may be used and selectively melted and bonded to form a 3D object. Different types of 3D printers are available today. The different types of 3D printers may perform different types of additive printing. Examples of 3D printing technology may include extrusion-based printing, such as fused filament fabrication (FFF), also known as fused deposition modeling (FDM), selective laser sintering (SLS), selective laser melting (SLM), electronic beam melting (EBM), digital light processing (DLP), stereolithography (SLA), laminated object manufacturing (LOM), binder jetting, and the like.

SUMMARY

According to aspects illustrated herein, there are provided a particle for use in three-dimensional (3D) printers. One disclosed feature of the embodiments is a particle, comprising a polymer resin that is compatible with a 3D printing process to print a 3D object and a marking additive that allows selective portions of the 3D object to change color when exposed to a light, wherein the marking additive is added to approximately 0.01 to 25.00 weight percent (wt %).

Another disclose feature of the embodiments is a method to produce a particle with a marking additive for a 3D printer. The method comprises providing a polymer resin that is compatible with the 3D printer and mixing the polymer resin with the marking additive in amount of approximately 0.01 to 25.00 weight percent (wt %) to form the particle with the marking additive.

Another disclosed feature of the embodiments is a method marking a three-dimensional (3D) printed object that is printed with a particles with a marking additive. The method comprises receiving, by a processor, instructions to print the 3D printed object, controlling, by the processor, a powder-based 3D printer to print the 3D printed object in accordance with the instructions, wherein the 3D printed object is printed with the particles containing the marking additive, wherein the particles containing the marking additive comprises a polymer resin and 0.01 to 25.00 weight percent (wt) of the marking additive, receiving, by the processor, marking instructions associated with a marking for the 3D printed object, and controlling, by the processor, a laser to expose portions a surface of 3D printed object in accordance with the marking instructions to change a color of the portions of the surface of 3D printed object to write the marking on the surface of the 3D printed object.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure is related to a particle with marking additives and a method for making the same. In addition, the particle with marking additives can be used to print 3D objects and mark the 3D objects by changing the color of selected portions of the surface of the 3D object. As discussed above, various 3D printing technologies are used today. Additive manufacturing methods using powdered materials may include powder bed fusion (PBF), selective laser sintering (SLS), selective heat sintering (SHM), binder jetting, and multi jet fusion (MJF). In the SLS printing method, for instance, the particles are fused together by the energy from a laser. However, after the 3D object is printed, marking images can be added to provide identification of the object, labeling information, security information, and the like.

Currently available ways of marking a 3D printed object have many drawbacks. For example, a separately printed label can be applied to the object. However, the label can be easily removed or damaged. Another example may be to physically print the label into the object as part of the printing process. In other words, the desired marks can be physically printed (e.g., the desired letters are raised portions on the surface of the 3D object) into the 3D printed object. Another example may be to etch away or melt away portions of the 3D printed object using, for example, laser engraving. However, since most 3D-printed objects have a rough surface texture, these solutions may not be suitable to achieve high contrast markings for many areas of application. Further, these solutions may suffer from additional complexity, limitations on how small markings can be printed due to the physical properties of the material, and so forth.

The present disclosure provides a particle with marking additives that can be used in SLS-based 3D printers. The marking additives can absorb light to change the optical properties of the particles. For example, certain marking additives can result in optical or color change of portions of the 3D printed object fabricated with the particles with marking additives when exposed to infrared light.

Thus, markings can be written directly into the surface of the 3D printed object by exposing desired locations on the surface to a light source. The portions that are exposed to the light source may change color and the marking may be written on the surface of the 3D printed object. The markings may be written to any desired size. In addition, the markings may be added relatively quickly as the marking additive may change color when exposed to light at speeds up to 8 meters per second. Thus, the markings created by the particles with the marking additives may be more permanent and secure than currently available marking methods.

Figure 1:
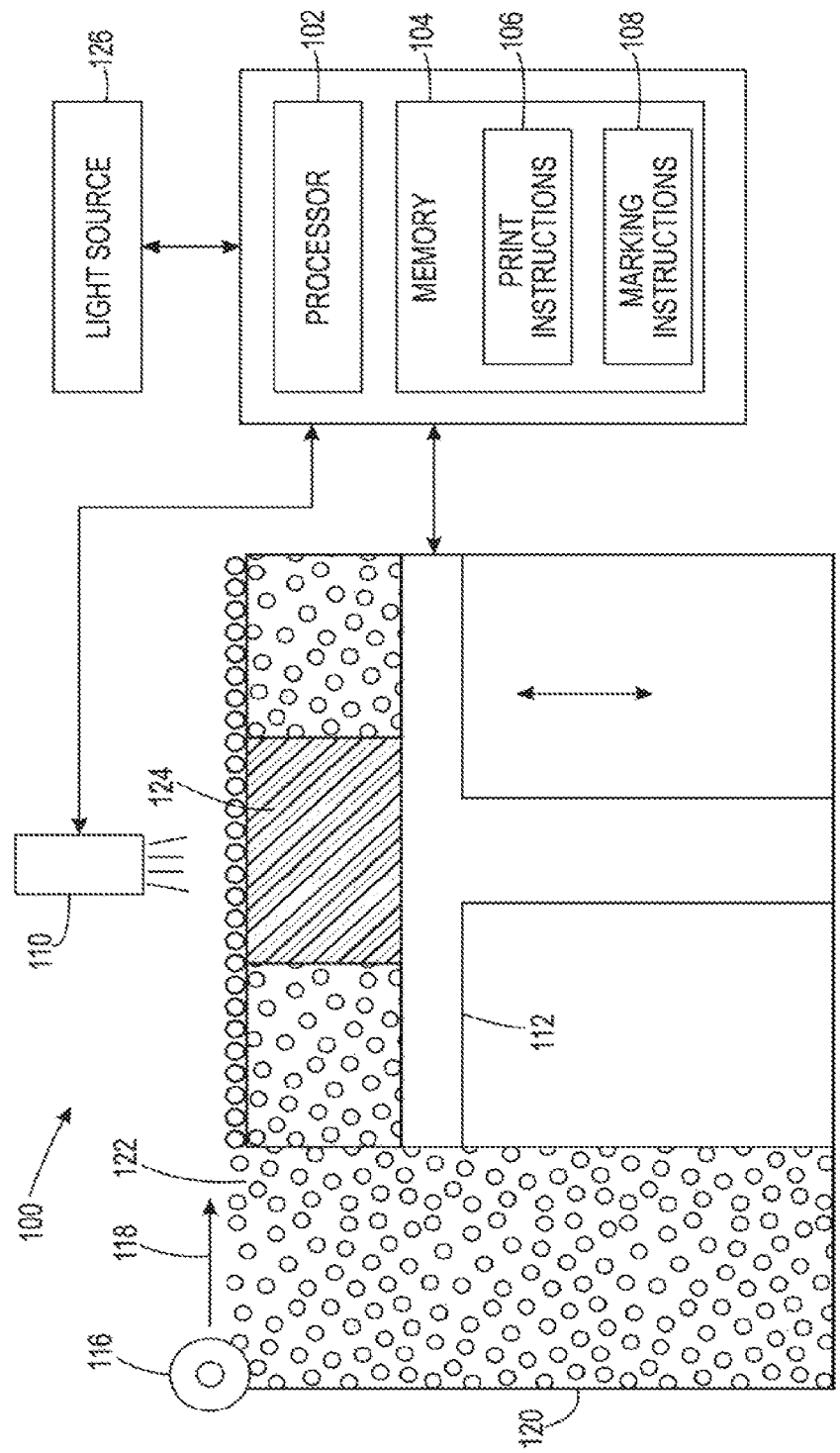
FIG. 1 illustrates an example of a selective laser sintering (SLS)-based printer that uses the particles with the marking additives of the present disclosure.

FIG. 1 illustrates an example of a selective laser sintering (SLS)-based printer 100 that uses particles with marking additives 122 (also herein referred to as a particle 122 or particles 122) of the present disclosure. Although FIG. 1 illustrates a particular type of SLS-based printer as an example, it should be noted that the particles 122 can be used with any type of powder-based printer or additive printing process. In one embodiment, the SLS-based printer 100 may include a hopper 120 that is filled with the particles 122. The hopper 120 may be located adjacent to a movable platform 112. The platform 112 may move up and down as each layer of the particles 122 is printed.

In one embodiment, the hopper 120 may have a movable bottom that can push the particles 122 above an edge of the hopper. A roller 116 may move laterally (as shown by an arrow 118) to dispense the particles 122 on to the platform 112. The roller 116 may provide a smooth even layer of the particles 122 for each layer of a three-dimensional (3D) printed object 124 that is printed. It should be noted that FIG. 1 illustrates one example of how the particles 122 may be dispensed. Other examples may also be within the scope of the present disclosure.

In one embodiment, an energy source 110 (e.g., a laser, an ultra violet (UV) light source, a heat source, and the like) may be located above the platform 112. The energy source 110 may selectively sinter or fuse the particles 122 to print the 3D printed object 124. For example, the energy source 110 may fuse the particles 122 layer-by-layer until the entire 3D printed object 124 is printed. In one embodiment, the energy source 110 may operate at specific settings (e.g., power, frequency, a wavelength, and the like) that do not cause the marking additive in the particles 122 to change color. In other words, the energy source 110 may operate at the settings that allow sintering or fusing of the particles 122 to print a 3D object, but do not overlap with the wavelength of light emitted by a light source 126, described below.

In one embodiment, the energy source 110 may be coupled to a gimbal or movable arm that allows the energy source 110 to move along a two-dimensional plane parallel to a layer of the particles 122 on the platform 112. In another embodiment, the energy source 110 may be stationary and the platform 112 may also move side-to-side below the energy source 110.

In one embodiment, a sintering fluid may be dispensed onto the layer of particles 122. The sintering fluid may be dispensed in accordance with a desired shape or pattern of a particular layer of the 3D printed object 124. The energy source 110 may be applied to the layer and the portions of the layer of particles 122 that receive the sintering fluid may be fused together to form a layer of the 3D printed object 124.

In one embodiment, the SLS-based printer may be controlled by a processor 102 that is communicatively coupled to the energy source 110, the platform 112, and the roller 116. The SLS-based printer 100 may also include a memory 104 that is communicatively coupled to the processor 102. The memory 104 may be any type of non-transitory computer readable medium. For example, the memory 104 may be a hard disk drive, a solid state drive, a random access memory, a read-only memory, and the like.

In one embodiment, the memory 104 may include instructions that are executed by the processor 102. For example, the memory 104 may include print instructions 106 and marking instructions 108. In one embodiment, the processor 102 may control the feed of the particles 122, movement of the energy source 110, and the platform 112 in accordance with the print instructions 106 to print the 3D printed object 124.

In one embodiment, the processor 102 may also control the light source 126 to mark the 3D printed object 124. Although the light source 126 is illustrated in FIG. 1 as being part of the SLS-based printer 100, it should be noted that the light source 126 may be part of a separate device controlled by a separate controller or processor. In other words, after the 3D printed object 124 is completed, the object can be transferred to another apparatus with the light source 126 to receive light for marking the 3D printed object 124.

The processor 102 may mark the 3D printed object 124 in accordance with the marking instructions 108. The light source 126 may be a laser that may be operated at a wavelength in an infrared region ranging from approximately 700 nanometers (nm) to 10.6 microns (μm). Examples of lasers may include solid-state lasers, diode or diode array lasers, yttrium aluminum garnet (YAG) lasers, fiber lasers, carbon dioxide ($CO_2$) lasers, and the like. The light source 126 may be operated in a pulsed mode or a continuous mode.

As noted above, the particles 122 may include a marking additive. When the particles 122 with marking additives are exposed to a certain wavelength of light from the light source 126, the surface of the 3D printed object 124 that is exposed to the light may change color. Thus, the marking can be directly "written" on the 3D printed object 124 by the light source 126. Notably, the marking is not being etched or physically formed by additional printing of the particles 122. Rather, the optical properties of the particles 122 with marking additives are being changed to create the markings. As a result, the markings may be more secure and permanent than what is produced using current methods to add markings to 3D printed objects.

In one embodiment, the particles 122 may be formulated or created by mixing a polymer resin with a marking additive. The polymer resin may be any type of polymer resin that is compatible with the SLS-based printer 100. For example, the polymer resin may have a melting temperature and a viscosity that allows the SLS-based printer 100 to control how the polymer resin is deposited. The polymer resin may be a thermoplastic, including crystalline, semi-crystalline, or amorphous polymer resins. Examples of polymer resins that can be used include acrylic resins; polymers or copolymers produced from the monomers selected from the group consisting of acrylonitrile, butadiene, styrene, an acrylate, a methacrylate, and a mixture thereof; polyolefins; polyesters; polycarbonates; polylactic acid; thermoplastic polyurethanes; polyamides; polyimides; polysulfone; poly (aryl ethers); poly(aryl ether ketones); poly(aryl ether sulfones); poly(ether imide); polyarylenesulfides, poly(vinyl alcohol), polyvinylidene fluoride, or any combinations thereof. Specific examples of the polymer resins are polymethyl methacrylate (PMMA), acrylonitrile butadiene styrene (ABS) resin, Nylon-6, nylon-12, polyethylene terephthalate (PET), polybutylene terephthalate (PBT), polyethylene, polypropylene, polypropylene, polyaryletherketones (PAEK), polylactic acid (PLA), thermoplastic polyurethanes (TPU), and the like, or any combinations thereof.

In one embodiment, the marking additives used in the particles 122 of the present disclosure should possess good light fastness and weatherability. In addition, the marking additives should be compatible with the manufacturing processes of the particles 122 and the 3D printing processes described herein. For example, the marking additives may have good thermal stability at a temperature that is at least that of a melting point or softening temperature of the particles 122. Furthermore, the marking additive may be compatible with the polymer resins used for the particles 122, be environmentally friendly, readily available, and non-toxic.

In one embodiment, the marking additive may be a light absorbing marking additive. In one embodiment, the marking additive may be an infrared light absorbing marking additive. The marking additive may possess efficient absorption of the light radiation within a wavelength region of the light source 126. The marking additive may be added or mixed with the polymer resin at approximately 0.01 weight percent (wt %) to 25.00 wt %. In one embodiment, the marking additive may be added at approximately 0.50 wt % to 10.00 wt %. In one embodiment, the marking additive may be added at approximately 0.50 wt % to 5.00 wt %. The weight percentage may be a ratio of the marking additive to a total weight of the particle 122.

In one embodiment, the amounts of the marking additives described herein may allow the polymer resin to maintain good printability in the SLS-based printer 100. In addition, the amounts of the marking additives may allow the polymer resins to maintain similar mechanical strengths of the 3D printed object 124 as compared to the polymer resins without the marking additives.

In one embodiment, the marking additive may be an additive that changes color or reacts when exposed to a light emitted by the light source 126. In one embodiment, the marking additive may include an infrared absorption component that absorbs wavelengths of approximately 700 nanometers (nm) to 11,000 nm. For example, the light may be emitted by a laser beam that is operated at a continuous mode or a pulsed mode. In one embodiment, the marking additive may absorb wavelengths of approximately 780 nm to about 2500 nm. For example, the light may be emitted by a solid-state laser, including yttrium orthovanadate (Nd:YVO4), yttrium lithium fluoride (Nd:YLF) and yttrium aluminium garnet (Nd:YAG), which operates in the infrared spectrum at around 1064 nm. In one embodiment, examples of the infrared absorption component may include a metal oxide, a non-stoichiometric metal oxide, a metal hydroxide, a copper hydroxyphosphate, a copper pyrophosphate, a base copper carbonate, ammonium octamolybdate, a silver halide, a phthalocyanine, a naphthalocyanine, graphitic oxide, graphene oxide, carbon black, or a mixture thereof.

Examples of metals for the metal oxide or the non-stoichiometric metal oxide may include tin, antimony, bismuth, boron, titanium, indium, iron, copper, molybdenum, tungsten, vanadium, or any combination thereof. Examples of the metal oxide or non-stoichiometric metal oxide may include titanium oxide, boron anhydride, tin oxide, bismuth oxide, copper oxide, iron oxide, molybdenum oxide, vanadium oxide, antimony-doped tin oxide, antimony-doped indium tin oxide, reduced indium tin oxide, oxygen-deficient bismuth oxide, metal hydroxides, or any combination thereof. Examples of the metal hydroxide may include aluminum hydroxide, magnesium hydroxide, copper hydroxide, and a mixture thereof. Examples of the phthalocyanines include metal-free phthalocyanines and metal phthalocyanines such as copper phthalocyanines. Similarly, the example of the naphthalocyanines may include metal-free or metal naphthalocyanines.

In one embodiment, the particles 122 may include a marking additive that absorbs light at wavelengths of approximately 780 nm to 2500 nm emitted by a near infrared laser. For example, the near infrared laser may be a YAG laser which operates at a wavelength of approximately 1064 nm. In one embodiment, the particles 122 may include a marking additive that absorbs light at wavelengths above 2500 nm using a $CO_2$ laser operating at approximately 10.6 µm.

In one embodiment, the marking additive used for the particles 122 disclosed herein may further comprise a developer component. The developer component itself may not be sensitive to the radiation emitted by the light source 126. However, when used in combination with marking additives described above (e.g., the metal oxides, metal salts, and/or the metal compounds, carbon black, graphene oxide, or any combination thereof), the developer component may be reactive to assist color change of the portions of the 3D printed objected 124 printed with the particles 122. Suitable developer components may include a polyphenol, a melamine resin, a polysaccharide, or any combination thereof.

In one embodiment, the marking additive may be provided in a particulate form. The marking additive may be particles having an average diameter of approximately 10 nm to 5000 nm. In one embodiment, the particles may have an average diameter of approximately 10 nm to 1000 nm.

In one embodiment, the marking additive may also include an inert support material. Examples of the inert support material may include silica, alumina, titanium oxide, zinc oxide, mica, calcium carbonate, kaolin, talc, ceramic, and the like.

In one embodiment, the particles 122 may also include a pigment or a colorant. The pigment or colorant may be inert to the radiation received during the marking process. However, the pigment or colorant may provide a background to enhance the marking contrast or visibility. Examples of the pigment or colorant that can be used include titanium oxide, zinc oxide, iron oxide, carbon black, organic pigments, and the like.

In one embodiment, the particles 122 may be formed from a mixture of the polymer resin and the marking additive. The particles 122 may have an average particle size of about 5 µm to about 200 µm, about 30 µm to about 70 µm, about 60 µm to about 110 µm, or about 100 µm to about 200 µm. For instance, the particles 122 may be obtained by cryogenic grinding or precipitation processes using a blend of the polymer and the marking additive.

In one embodiment, the particles 122 are produced according to a melt emulsification process. In one embodiment, the process may include mixing a mixture comprising a blend of the polymer and the marking additive, and a carrier fluid that is immiscible with the polymer blend. In one embodiment, inorganic oxide nanoparticles can be optionally added. The mixture may be heated to a temperature greater than a melting point or a softening temperature of the polymer resin. Shear may be applied to the mixture at a shear rate that is sufficiently high to disperse the polymer resin in the carrier fluid. The mixture may then be cooled to below the melting point or softening temperature of the polymer resin to form solidified particles, or particulates, comprising the polymer and the marking additive. The particulates can then be separated from the carrier fluid.

In the process described herein the inorganic oxide nanoparticles may be optionally added as a surface active agent and/or a stabilizer component to produce the particle 122 with better controlled particle size and particle size distribution. Furthermore, the inorganic oxide nanoparticles associated with the outer surface of the resultant particles 122 may serve as a flow aid to improve the followability of the 3D printing powder.

Suitable carrier fluids for the melt emulsification process may have a viscosity at 25° C. of about 1,000 centistokes (cSt) to about 150,000 cSt (or about 1,000 cSt to about 60,000 cSt, or about 40,000 cSt to about 100,000 cSt, or about 75,000 cSt to about 150,000 cSt). Examples of the carrier fluids may include, but are not limited to, silicone oil, polysiloxanes modified with fatty acids, polysiloxanes modified with fatty alcohols, polysiloxanes modified with polyoxy alkylenes, and the like, fluorinated silicone oils, polyethylene glycols, paraffins, and any combination thereof. Examples of silicone oils include, but are not limited to, polydimethylsiloxane, methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and the like, and any combination thereof. The carrier fluid may be present in the mixture at about 40 wt % to about 90 wt % (or about 75 wt % to about 95 wt %, or about 70 wt % to about 90 wt %, or about 55 wt % to about 80 wt %, or about 50 wt % to about 75 wt %, or about 40 wt % to about 60 wt %) of the polymer and carrier fluid combined.

The inorganic oxide nanoparticles suitable for the melt emulsification process may include, but are not limited to, silica, titania, zirconia, alumina, iron oxide, copper oxide, tin oxide, and the like, and any combination thereof. The oxide nanoparticles may by hydrophilic or hydrophobic, which may be native to the particle or a result of surface treatment of the particle. Illustrative examples of the oxide nanoparticles include a silica nano particle having a hydrophobic surface treatment, like dimethyl silyl, trimethyl silyl, and the like. Commercially available examples of silica nanoparticles include, but are not limited to, AEROSIL® particles available from Evonik, such as AEROSIL® R812S, AEROSIL® RX50, AEROSIL® 380, and the like. The oxide nanoparticles may have an average diameter of about 1 nm to about 500 nm (or about 10 nm to about 150 nm, or about 25 nm to about 100 nm, or about 100 nm to about 250 nm, or about 250 nm to about 500 nm). Oxide nanoparticles may be included in the mixture at a concentration of about 0.01 wt % to about 10 wt % (or about 0.01 wt % to about 1 wt %, or about 0.1 wt % to about 3 wt %, or about 1 wt % to about 5 wt %, or about 5 wt % to about 10 wt %) based on the weight of the polymer.

The melt emulsification process may be carried out, for example, using extruders (e.g., continuous extruders, batch extruders), reactors with mixing or inline homogenizer systems, and the like, and apparatuses derived therefrom.

EXAMPLE 1

In a batch-based process, 400 grams (g) of polydimethylsiloxane oil (10,000 cSt viscosity measured at room temperature), 120 g of polyamide (PA12) pellets containing 2.5 weight percent (wt %) of antimony (Sb) doped tin oxide, and 0.4 g of R812S silica were added into a 1 liter glass kettle reactor. The mixture was heated to 220 degrees Celsius (° C.) for over 90 minutes with mixing at 260 rotations per minute (RPM) to form a melt dispersion. The melt dispersion was then mechanically stirred or mixed at 1250 RPM for an additional 40 minutes. After turning off the heat and stirring, the mixture slurry was discharged to room temperature, followed by washing with Heptane three times to remove the silicone oil. The resulting powder was dried in a fume hood to produce a powder with an average particle size of approximately 50 µm.

EXAMPLE 2

In an extrusion-based process, 45 parts of ELASTOLLAN® 1190A10 thermoplastic polyurethane (TPU), 1.6 parts of copper hydroxyphosphase, 0.6 part of AEROSIL® RX50 silica, and 52.8 parts of polydimethylsiloxane oil (10,000 cSt viscosity measured at room temperature), are fed to the 25 mm twin-screw extruder (Werner & Pfleiderer ZSK-25), which is set at a temperature from 240-260° C., and mixing RPM from 900-1100. Resultant slurry is diluted with heptane and filtered to collect the particles with an average particle size from 25-75 µm.

EXAMPLE 3

In one example, 100 parts PA12 particles (having an average diameter of approximately 50 µm), 2 parts of titanium dioxide pigment (particle size in the range of 100-500 nm), and 2 parts of Sb-doped tin oxide were placed in a mixing reactor. The resultant mixture was blended at shear level that was sufficient to enable adhesion of the metal oxide on the polymer particles.

Figure 2:
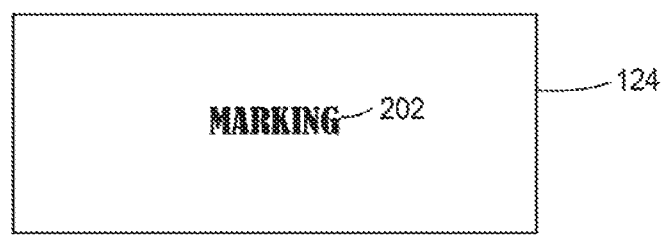
FIG. 2 illustrates an object that is printed with the particles containing the marking additives of the present disclosure that is marked.

FIG. 2 illustrates an example of the 3D printed object 124 that is marked. For example, the light source 126 may be used to expose portions of the surface of the 3D printed object 124 with a marking 202. The marking 202 may be created by changing the color of selected portions of the surface of the 3D printed object 124 with the light source 126.

In one embodiment, the markings 202 may be alphanumeric text. In one embodiment, the markings 202 may be a symbol or graphic. For example, the markings 202 may be a barcode or quick response (QR) code that can be read by a scanner. The markings 202 on the 3D printed object 124 may provide identification information, security information, product information, and the like, associated with the 3D printed object 124.

Figure 3:
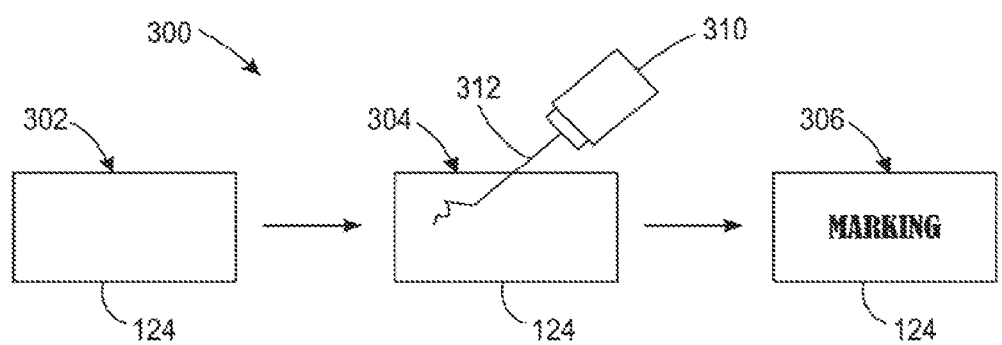
FIG. 3 illustrates an example process flow diagram of marking the 3D printed object printed with the particles containing the marking additives of the present disclosure.

FIG. 3 illustrates an example process flow diagram 300 of marking the 3D printed object 124 that is printed with the particles 122 with marking additives of the present disclosure.

At block 302, a 3D printed object 124 may be provided. At block 304, a light source 310 may emit light 312 onto the surface of the 3D printed object 124. The light source 310 and the light source 126 may be the same. For example, the light source 310 may be a laser light source that provides a pulsed laser light source or a continuous laser light source. The light 312 may be emitted at wavelengths that cause the exposed portions of the particles 122 with marking additives to react and change color. In one embodiment, the light 312 may be emitted from a YAG laser operating at a wavelength of approximately 1060 nm to 1070 nm.

At block 306, the light source 310 may be moved until the marking 302 is completed. For example, the light source 310 may be moved in accordance with the marking instructions 108 or the 3D printed object 124 may be moved below the light source 310 in accordance with the marking instructions 108.

In one embodiment, the particles 122 with marking additives may be marked efficiently with the light source 310. For example, the marking 202 may be written at speeds of up to 8 meters per second (8 m/s). Thus, light source 210 may be able to "write" over 1,000 alphanumeric characters per second. Thus, the particles 122 with marking additives allows the 3D printed object 124 to be marked efficiently or more quickly than other currently used marking methods (e.g., etching, additional 3D printing, and the like).

In addition, the particles 122 with marking additives allow finer precision when writing the marking 202. This may allow the marking 202 to be written in much smaller sized fonts than currently used methods. For example, when etching, the materials may melt and the characters may be difficult to read when written too small. Alternatively, the printer may not be able to print markings that are too small (e.g., the marking may be smaller than a voxel printing size of the printer). Thus, the particles 122 with marking additives provide more flexibility in the size and location of where the marking 202 can be printed.

Figure 4:
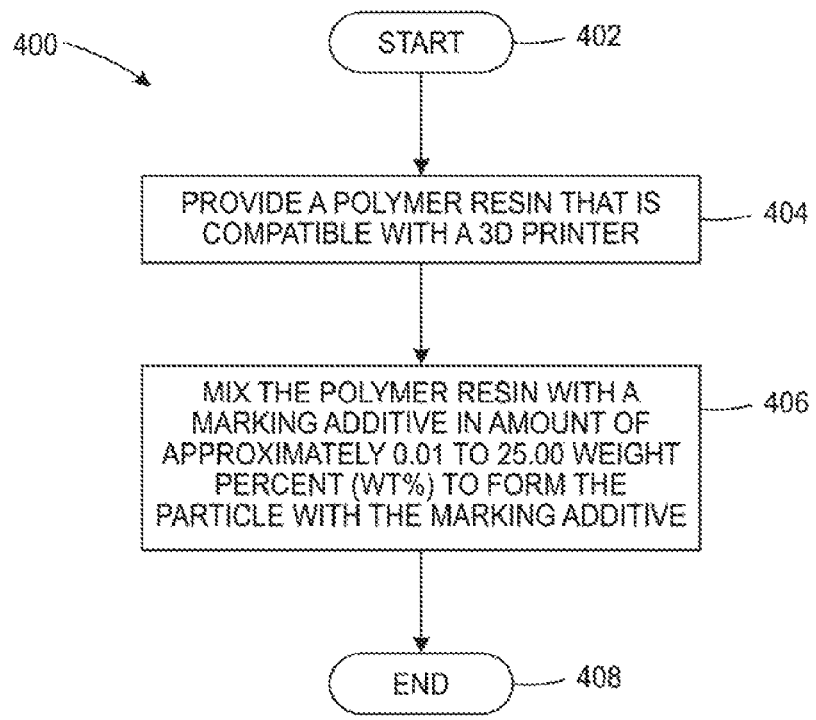
FIG. 4 illustrates a flow chart of an example method for producing a particle with a marking additive for an SLS-based printer.

FIG. 4 illustrates a flow chart of an example method 400 for producing a particle with a marking additive for a 3D printer (e.g., a selective laser sintering (SLS)-based printer) of the present disclosure. The method 400 may be performed by tools or a reactor, as described by the examples above, under the control of a processor.

At block 402, the method 400 begins. At block 404, the method 400 provides a polymer resin that is compatible with the 3D printer. The polymer resin may be any type of polymer resin that is compatible with the SLS-based printer. For example, the polymer resin may have a melting temperature and a viscosity that allows the SLS-based printer to control how the polymer resin is deposited. Examples of polymer resins that can be used include acrylic resins; polymers or copolymers produced from the monomers selected from the group consisting of acrylonitrile, butadiene, styrene, an acrylate, a methacrylate, and a mixture thereof; polyolefins; polyesters; polycarbonates; polylactic acid; thermoplastic polyurethanes; polyamides; polyimides; polysulfone; poly(aryl ethers); poly(aryl ether ketones); poly(aryl ether sulfones); poly(ether imide); polyarylenesulfides, poly(vinyl alcohol), polyvinylidene fluoride, or any combinations thereof. Specific examples of the polymer resins are polymethyl methacrylate (PMMA), acrylonitrile butadiene styrene (ABS) resin, Nylon-6, nylon-12, polyethylene terephthalate (PET), polybutylene terephthalate (PBT), polyethylene, polypropylene, polypropylene, polyaryletherketones (PAEK), polylactic acid (PLA), thermoplastic polyurethanes (TPU), and the like, or any combinations thereof.

At block 406, the method 400 mixes the polymer resin with the marking additive in an amount of approximately 0.01 to 25.00 weight percent (wt %) to form the particle with the marking additive. In one embodiment, the marking additive may be a light absorbing marking additive. In one embodiment, the marking additive may be an infrared light absorbing marking additive.

In one embodiment, the amounts of the marking additives described herein may allow the polymer resin to maintain good printability in the SLS-based printer. In addition, the amounts of the marking additives may allow the polymer resins to maintain the similar mechanical strengths of the 3D printed object as compared to the polymer resins without the marking additives.

In one embodiment, the marking additive may be an additive that changes color or reacts with light emitted at wavelengths of approximately 780 nanometers (nm) to 11,000 nm. In one embodiment, the wavelengths may be narrower so that the wavelengths do not overlap with the wavelengths emitted by an energy source of the SLS-based printer. For example, the wavelengths of light used for marking may be approximately 1060 nm-1070 nm.

In one embodiment, the light may be emitted by a semi-conducting laser beam that is continuously emitted or pulsed. Examples of suitable marking additives may include a metal oxide, a non-stoichiometric metal oxide, a metal hydroxide, a copper hydroxyphosphate, a copper pyrophosphate, a base copper carbonate, ammonium octamolybdate, a silver halide, a phthalocyanine, a naphthalocyanine, graphitic oxide, graphene oxide, carbon black, or a mixture thereof.

In one embodiment, after the polymer resin and the marking additive are mixed together to form a mixture, the mixture may be further processed to form a powder with particles having an average particle size of approximately 5 μm to about 200 μm, about 30 μm to about 70 μm, about 60 μm to about 110 μm, or about 100 μm to about 200 μm. In one embodiment, the mixture may be melted, stirred, and dried in a fume hood (e.g., Example 1 above). In one embodiment, the mixture may be mechanically stirred at a shear rate sufficient to create an adhesion of the marking additive to the particles of the polymer resin. At block 408, the method 400 ends.

Figure 5:
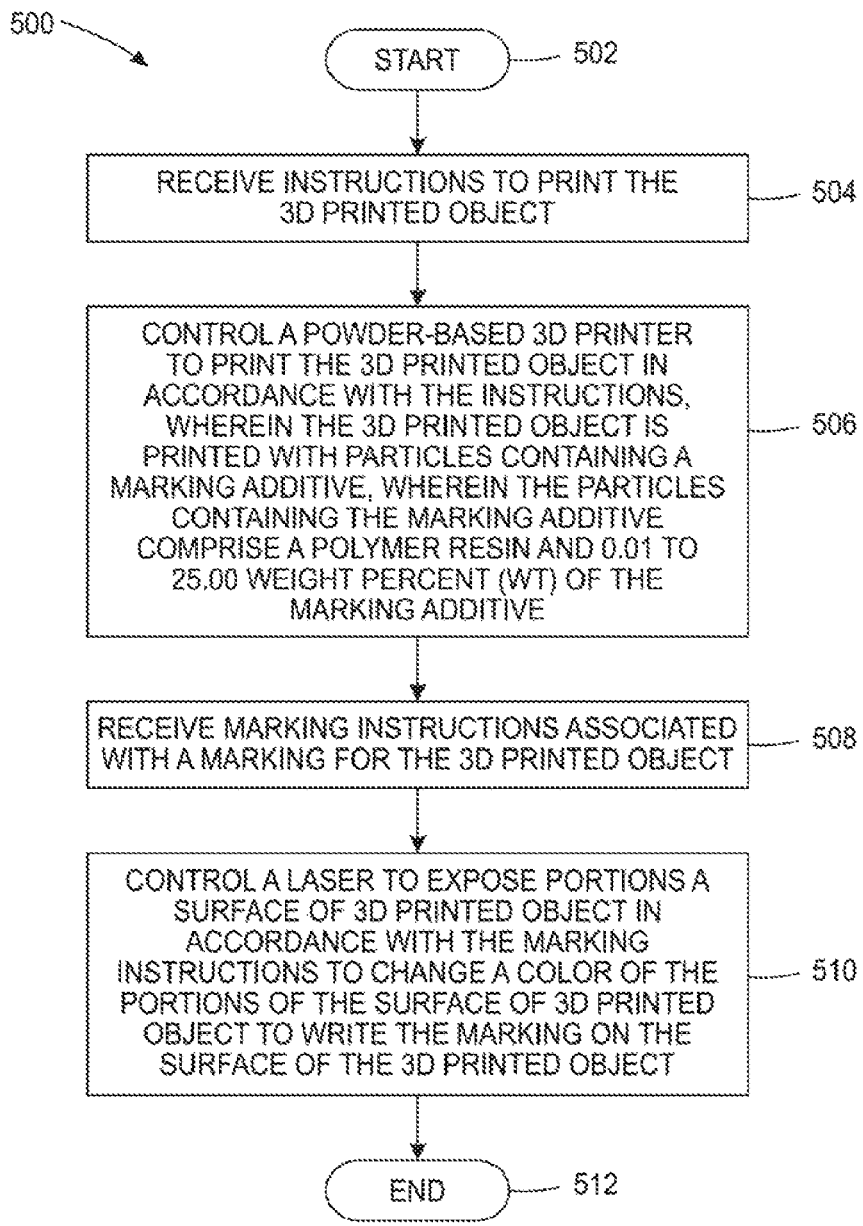
FIG. 5 illustrates a flow chart of an example method for marking a 3D printed object that is printed with the particles containing the marking additives.

FIG. 5 illustrates a flow chart of an example method 500 for marking a three-dimensional (3D) printed object that is printed with particles containing a marking additive. The method 500 may be performed by the SLS-based printer 100 or the processor 102 described above.

At block 502, the method 500 begins. At block 504, the method 500 receives instructions to print the 3D printed object. For example, the design of the 3D printed object may be created on a computing device (e.g., a computer aided drawing (CAD) program executed on the computing device). The design may include parameters for an amount of the particles to be dispensed on each layer along an X-Y coordinate system. The design may be stored as print instructions that are provided to the SLS-based printer and stored in memory in the SLS-based printer.

At block 506, the method 500 controls a powder-based 3D printer (e.g., a selective laser sintering (SLS)-based printer) to print the 3D printed object in accordance with the instructions, wherein the 3D printed object is printed with the particles containing the marking additive, wherein the particles containing the marking additive comprise a polymer resin and 0.01 to 25.00 weight percent (wt %) of the marking additive. The particles may include a polymer resin mixed with the marking additive. The polymer resin may be any type of polymer resin that is compatible with the powder-based 3D printer. For example, the polymer resin may have a melting temperature and a viscosity that allows the SLS-based printer to control how the polymer resin is dispensed. Examples of polymer resins that can be used include acrylic resins; polymers or copolymers produced from the monomers selected from the group consisting of acrylonitrile, butadiene, styrene, an acrylate, a methacrylate, and a mixture thereof; polyolefins; polyesters; polycarbonates; polylactic acid; thermoplastic polyurethanes; polyamides; polyimides; polysulfone; poly(aryl ethers); poly(aryl ether ketones); poly(aryl ether sulfones); poly(ether imide); polyarylenesulfides, poly(vinyl alcohol), polyvinylidene fluoride, or any combinations thereof. Specific examples of the polymer resins are polymethyl methacrylate (PMMA), acrylonitrile butadiene styrene (ABS) resin, Nylon-6, nylon-12, polyethylene terephthalate (PET), polybutylene terephthalate (PBT), polyethylene, polypropylene, polypropylene, polyaryletherketones (PAEK), polylactic acid (PLA), thermoplastic polyurethanes (TPU), and the like, or any combinations thereof.

In one embodiment, the marking additive may be a light absorbing marking additive. In one embodiment, the marking additive may be an infrared light absorbing marking additive.

In one embodiment, the amounts of the marking additives described herein may allow the polymer resin to maintain good printability in the SLS-based printer. In addition, the amounts of the marking additives may allow the polymer resins to maintain similar mechanical strengths of the 3D printed object as compared to the polymer resins without the marking additives.

In one embodiment, the marking additive may be an additive that changes color or reacts with light emitted at wavelengths of approximately 780 nanometers (nm) to 11,000 nm. For example, the light may be emitted by a laser beam that is operated in a continuous mode or a pulsed mode. Examples of suitable marking additives may include a metal oxide, a non-stoichiometric metal oxide, a metal hydroxide, a copper hydroxyphosphate, a copper pyrophosphate, a base copper carbonate, ammonium octamolybdate, a silver halide, a phthalocyanine, a naphthalocyanine, graphitic oxide, graphene oxide, carbon black, or a mixture thereof.

The particles may be dispensed onto a platform. The 3D printed object may be printed layer-by-layer by sintering selective portions of the particles, as described above.

At block 508, the method 500 receives marking instructions associated with a marking for the 3D printed object. In one embodiment, the marking instructions may be provided through a user interface of the powder-based 3D printer. In one embodiment, the marking instructions may be created on a separate computing device and transmitted to the powder-based 3D printer and stored in memory.

The marking for the 3D printed object may be alphanumeric text, a graphic, an image, or any combination thereof. The marking may include identification information, security information, product information, and the like. The marking may be a bar code or a QR code that can be scanned by a reader. The marking may be a company logo, and so forth.

At block 510, the method 500 controls a laser to expose portions a surface of 3D printed object in accordance with the marking instructions to change a color of the portions of the surface of 3D printed object to write the marking on the surface of the 3D printed object. In one embodiment, the powder-based 3D printer may include the laser to create the marking in accordance with the marking instructions. In one embodiment, the processor that controls the powder-based 3D printer may be communicatively coupled to the laser. In one embodiment, the 3D printed object may be moved from the powder-based 3D printer to a marking apparatus that includes the laser.

In one embodiment, a laser may provide a pulsed laser light source or continuous laser light source that may be applied to the select portions of the particles. The light may be emitted at wavelengths of approximately 780 nm to 11,000 nm. The laser may be moved, the 3D printed object may be moved, or both the laser and the 3D printed object may be moved to "write" the marking onto the surface of the 3D printed object. The marking may be formed by a reaction of the marking additive in the particles to the light emitted by the laser. The reaction may cause the marking additive to change color in the particles. At block 512, the method 500 ends.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for producing particulates having a marking additive for a three-dimensional (3D) printer, comprising:
   providing a polymer resin that is compatible with the 3D printer; and
   mixing the polymer resin with approximately 0.01 to 25.00 weight percent (wt %) of the marking additive, based upon a total weight of the particulates, to form the particulates with the marking additive in the polymer resin;
   wherein mixing comprises:
      heating a mixture of the polymer resin and the marking additive in a carrier fluid to a temperature at or above a melting point of the polymer resin,
         wherein the polymer resin and the carrier fluid are substantially immiscible at the temperature;
      applying shear to the mixture to disperse the polymer resin as liquefied droplets in the carrier fluid at the temperature;
      cooling the carrier fluid to a second temperature to form the particulates comprising the marking additive in the polymer resin; and
      separating the particulates from the carrier fluid;
         wherein a plurality of inorganic oxide nanoparticles are also present in the carrier fluid, and at least a portion of the plurality of inorganic oxide nanoparticles are associated with an outer surface of at least a portion of the particulates.

2. The method of claim 1, wherein the plurality of inorganic oxide nanoparticles comprise at least silica nanoparticles.

3. The method of claim 1, wherein the plurality of inorganic oxide nanoparticles are present in the carrier fluid at about 0.05 to about 5 weight percent (wt %), based on a weight of the polymer resin.

4. The method of claim 1, wherein the polymer resin comprises at least one of acrylic resins; polymers or copolymers produced from monomers selected from the group consisting of acrylonitrile, butadiene, styrene, an acrylate, a methacrylate, and a mixture thereof; polyolefins; polyesters; polycarbonates; polylactic acid; thermoplastic polyurethanes; polyamides, polyimides; polysulfone; poly(aryl ethers); poly(aryl ether ketones); poly(aryl ether sulfones); poly(ether imide); polyarylenesulfides; poly(vinyl alcohol); or polyvinylidene fluoride.

5. The method of claim 1, wherein the marking additive comprises at least one of a metal oxide, a non-stoichiometric metal oxide, a metal hydroxide, a copper hydroxyphosphate, a copper pyrophosphate, a base copper carbonate, ammonium octamolybdate, a silver halide, a phthalocyanine, a naphthalocyanine, graphitic oxide, graphene oxide, or carbon black.

6. The method of claim 5, wherein the metal oxide comprises at least one of titanium oxide, boron anhydride, tin oxide, bismuth oxide, copper oxide, iron oxide, molybdenum oxide, or vanadium oxide.

7. The method of claim 5, wherein the non-stoichiometric metal oxide comprises at least one of tin, antimony, bismuth, boron, titanium, indium, iron, copper, molybdenum, tungsten, or vanadium.

8. The method of claim 5, wherein the metal hydroxide comprises at least one of aluminum hydroxide, magnesium hydroxide, or copper hydroxide.

* * * * *